United States Patent
Witt et al.

(10) Patent No.: US 10,483,748 B2
(45) Date of Patent: Nov. 19, 2019

(54) JUNCTION BOX AND NETWORK FOR DISTRIBUTING ENERGY

(71) Applicant: HARTING Electric GmbH & Co. KG, Espelkamp (DE)

(72) Inventors: John Witt, Detmold (DE); Andreas Huhmann, Espelkamp (DE)

(73) Assignee: HARTING Electric GmbH & Co., KG, Espelkamp (DE)

( * ) Notice: Subject to any disclaimer, the term of this patent is extended or adjusted under 35 U.S.C. 154(b) by 57 days.

(21) Appl. No.: 15/565,115

(22) PCT Filed: Mar. 23, 2016

(86) PCT No.: PCT/DE2016/100139
§ 371 (c)(1),
(2) Date: Oct. 6, 2017

(87) PCT Pub. No.: WO2016/162012
PCT Pub. Date: Oct. 13, 2016

(65) Prior Publication Data
US 2018/0097349 A1  Apr. 5, 2018

(30) Foreign Application Priority Data
Apr. 9, 2015 (DE) .......... 10 2015 105 370

(51) Int. Cl.
*H02H 3/02* (2006.01)
*H02H 7/20* (2006.01)
(Continued)

(52) U.S. Cl.
CPC .............. *H02H 3/021* (2013.01); *H02H 7/20* (2013.01); *H02H 7/222* (2013.01); *H02H 7/263* (2013.01); *H02J 13/00* (2013.01)

(58) Field of Classification Search
CPC .......... H02H 3/021; H02H 7/20; H02H 7/222; H02H 7/263; H01H 7/00; H01H 89/00; H01H 9/548; H02J 13/00
(Continued)

(56) References Cited

U.S. PATENT DOCUMENTS

| | | | |
|---|---|---|---|
| 4,689,708 A | 8/1987 | Hager et al. | |
| 5,898,557 A * | 4/1999 | Baba ................. | H03K 17/0822 361/100 |

(Continued)

FOREIGN PATENT DOCUMENTS

| | | |
|---|---|---|
| AT | 506 092 A4 | 6/2009 |
| CA | 2 830 858 C | 8/2016 |

(Continued)

OTHER PUBLICATIONS

German Office Action, dated Oct. 2, 2015, for German Application No. 10 2015 105 370.5, 11 pages.

(Continued)

*Primary Examiner* — Dinh T Le
(74) *Attorney, Agent, or Firm* — Seed IP Law Group LLP (57) ABSTRACT

Systems and methods are provided to improve the reliability of energy networks during an activation and deactivation under load and the measurement of energy consumption. An example method for operating an energy network which has multiple junction boxes includes: opening an electronic switch of a junction box using an analysis unit of the junction box; waiting for a defined period of time; measuring the potential at an output of the electronic switch using the analysis program and a corresponding voltage measuring device; comparing the measured potential U with a specified value; setting a release parameter dependent on the measured potential falling below the specified value; and opening a mechanical isolator dependent on the release param- (Continued)

eter. The method may include: generating a priority level for the provided deactivation process; carrying out the deactivation process dependent on the priority level; and increasing a content of a counter if the deactivation process is successful and the release parameter has not been set.

15 Claims, 4 Drawing Sheets

(51) Int. Cl.
   *H02H 7/26* (2006.01)
   *H02J 13/00* (2006.01)
   *H02H 7/22* (2006.01)
(58) Field of Classification Search
   USPC .......................................................... 307/112
   See application file for complete search history.

(56) References Cited

U.S. PATENT DOCUMENTS

| | | | |
|---|---|---|---|
| 6,215,632 B1 | 4/2001 | Kaluza et al. | |
| 6,927,549 B2* | 8/2005 | Ashiya | H02P 29/02 |
| | | | 318/471 |
| 7,058,482 B2 | 6/2006 | Fletcher et al. | |
| 7,231,283 B2 | 6/2007 | Maier | |
| 7,631,204 B2 | 12/2009 | Hublitz et al. | |
| 7,929,327 B2 | 4/2011 | Haines et al. | |
| 8,570,699 B2* | 10/2013 | Shaya | H03K 17/0822 |
| | | | 361/93.1 |
| 8,842,403 B2 | 9/2014 | Hummel et al. | |
| 9,136,688 B2* | 9/2015 | Laschinski | H02H 1/0015 |
| 2014/0012425 A1 | 1/2014 | Huhmann et al. | |

FOREIGN PATENT DOCUMENTS

| | | |
|---|---|---|
| CN | 1618157 A | 5/2005 |
| DE | 43 10 635 A1 | 9/1993 |
| DE | 101 55 189 A1 | 7/2003 |
| DE | 10 2004 021 380 A1 | 12/2005 |
| DE | 10 2011 001 436 B3 | 7/2012 |
| DE | 10 2011 001 668 A1 | 10/2012 |
| EP | 0 886 878 B1 | 1/2000 |
| EP | 2 574 946 A1 | 4/2013 |
| EP | 2 692 066 B1 | 7/2015 |
| JP | 3384522 B2 | 3/2003 |
| JP | 2003-244986 A | 8/2003 |
| RU | 2 475 923 C2 | 2/2013 |
| WO | 03/049248 A2 | 6/2003 |
| WO | 2009/127817 A1 | 10/2009 |
| WO | 2011/095624 A1 | 8/2011 |
| WO | 2015/043663 A1 | 4/2015 |

OTHER PUBLICATIONS

International Search Report and Written Opinion, dated Jun. 20, 2016, for International Application No. PCT/DE2016/100139, 14 pages. (with English Translation of Search Report).

International Preliminary Report on Patentability, dated Oct. 10, 2017, for International Application No. PCT/DE2016/100139, 8 pages. (English Translation).

Chinese Office Action, dated Sep. 5, 2018, for Chinese Application No. 201680020803.0, 9 pages.

Russian Search Report, dated Aug. 10, 2018, for Russian Application No. 2017134485/07(060680), 2 pages.

Korean Office Action, dated Mar. 21, 2019, for Korean Application No. 10-2017-7027799, 7 pages.

* cited by examiner

JUNCTION BOX AND NETWORK FOR DISTRIBUTING ENERGY

BACKGROUND

Technical Field

This disclosure relates to a junction box and network for distributing energy comprising an input and at least one output and also an electronic switch and a mechanical isolator that is connected in series thereto, the input being connected to the output via the mechanical isolator so as to transmit energy. Furthermore the disclosure relates to an energy distribution network having multiple junction boxes, a method for operating an energy distribution network, and a method for switching off an output of a junction box.

Such junction boxes, energy distribution networks and methods are required in order to supply electrical energy to machines in an industrial environment.

Description of the Related Art

Numerous approaches and methods for distributing energy in an efficient and easy-to-operate manner are disclosed in the prior art.

DE 10 2004 021 380 A1 discloses a device for supplying current, said device comprising multiple current-supplying components. The current-supplying components are provided in each case with a communication interface and are connected by way of this communication interface and communication channel to a common analysis and control unit. The analysis and control unit controls a load management system of the current-supplying components.

DE 101 55 189 A1 discloses a method for regulating the current supply of multiple field devices that are connected by way of a data bus line and are supplied with current by way of the data bus line. The current requirement of the individual field devices is determined and the current consumption of the field devices is set by corresponding control signals. As a consequence, the current consumption of individual field devices is set centrally and the process conditions adjusted accordingly.

U.S. Pat. No. 7,058,482 B2 discloses a data sampling and data transmission module for an energy distribution system. The module comprises a microprocessor and a network interface. The microprocessor uses one or multiple first signals as an indication of the condition of the energy in the energy distribution system. The microprocessor is in communication with a data network by way of the network interface.

WO 2009/127817 A1 describes a self-organizing energy distribution network for large area regions. Said publication discloses switching a communication network parallel to the energy distribution network and by way of switches and measuring devices determining at least one part of the topography, wherein the energy distributing network is divided into zones that can be subsequently switched off separately from one another.

EP 2 692 066 A2 discloses an energy distribution network having a data transmission function for distributing electrical energy in the industrial sector. This energy distribution network comprises special junction boxes and an associated operating and evaluating method that renders it possible after construction and cabling to automatically detect and replicate the topology of the energy distribution. It is possible on this basis to subsequently determine the current consumption in specific branches, by way of example even in the case of a tree-like or annular network structure. In particular, it is possible to detect and localize deviations from the desired value, said deviations being by way of example a disproportionately high current consumption, so that as a result specific consumers and/or entire energy distribution network segments can be switched on and off. The corresponding values of relevant electrical variables are continuously monitored for analysis purposes and stored in a database, held in the database for an arbitrary period of time and displayed in a graphic manner. It is possible by analyzing the values of the respective electrical variables to detect and eliminate connection errors, wire fractures, overloading and under-voltages. In particular, the use of a power switch that is integrated in the junction boxes is disclosed.

Furthermore, EP 0 886 878 A1 discloses a switching device having a movable switch for producing an isolation section and having a switching element that is integrated in the switch, wherein the switching element is a semi-conductor switching element.

A disadvantage in the known art resides in the fact that the aforementioned energy distribution networks are either extremely costly or too inflexible for use in many applications, by way of example in the industrial sector. Furthermore, high demands are placed on the operational reliability, in particular relating to the switching-on and switching-off procedures.

BRIEF SUMMARY

Embodiments of the present invention improve the operational reliability and the operability of energy distribution networks in a cost-effective manner.

In particular, the reliability during the switching-on and switching-off procedures under a load and also the procedure of measuring the energy consumption within complex topologies are improved.

According to embodiments of the present invention, it is of particular advantage that the switching procedures can be performed in a safe and reliable and cost-effective manner.

Furthermore, it is of particular advantage that at least one part of the administrative tasks of the network is performed by the junction box itself, in other words in a decentralized manner. By way of example, it is possible by way of the evaluating unit to detect a technical defect at any early stage and to perform the corresponding action, for example switching off the output.

The junction box for distributing energy comprises at least one input and at least one output and also an electronic switch and a mechanical isolator that is connected in series thereto, for example a relay, by way of which the input is connected to the output for transmitting energy and is characterized in that the junction box comprises an internal evaluating unit having at least one processor and a data storage device, wherein an evaluating program is stored in the data storage device, said evaluating program being provided for the purpose of being performed by the processor.

The internal evaluating unit can be a separate assembly having a dedicated processor and a dedicated data storage device.

The junction box can however preferably comprise a so-called "data switch" that is connected by way of a data bus to the switch and the isolator and said data switch is combined with the evaluating unit to form a central evaluating and control unit.

The evaluating program can be characterized in particular by the following particularly advantageous features:

The evaluating program can include an adjustable selective response with regard to safety and reliability, said response being in the form of a selective safety and reliability procedure. The evaluating program includes in particular an adjustable overload response.

Furthermore, the evaluating program can include a learning mode for high start-up currents.

The evaluating program can comprise means for identifying connected devices.

Moreover, the evaluating program can comprise means for expanding a network with additional junction boxes.

The evaluating program can be configured in a decentralized or centralized manner.

The evaluating program can comprise means for establishing energy consumption data.

The evaluating program can comprise means for identifying connected devices.

The junction box can comprise a mechanical isolator for the galvanic decoupling procedure. It is particularly advantageous for this purpose if the evaluating program includes a counter for counting the number of galvanic isolation procedures performed by the mechanical isolator, in particular those isolation procedures that are performed under a load. If namely the isolator were sometimes still to perform the isolation procedure under a load, this would be as a result of wear on the isolator. The counter renders it possible in this case to establish how many of these isolation procedures the isolator has already performed. After a predetermined number of isolation procedures, it is possible to output inter alia an alarm signal/a corresponding piece of information that indicates that the isolator must be replaced.

As a consequence, it is also possible to use cost-effective isolators, and in particular isolators that are small in construction which renders it possible to construct a particularly advantageous, flat junction box that is particularly advantageous for use for example in the railway industry. This isolator can be configured in particular in a cost-effective manner since an isolation procedure is rarely performed under a load and, particularly by using a counter, it is fundamentally avoided that the same isolator frequently performs an isolation procedure under a load.

The isolator can be a so-called "relay" that is known to the person skilled in the art, in other words a mechanical, electronically controlled switch that causes a galvanic isolation in response to an electronic signal.

The junction box can comprise multiple separate outputs that can be switched off preferably independently of one another. In particular, each output can comprise a galvanic decoupling element that is in particular an isolator of this type. This has the advantage that each junction box forms a small independent unit to which it is possible to connect multiple consumers and said small independent unit is analyzed and controlled by a dedicated evaluating program, wherein each of the consumers can be switched off individually and in a safe and reliable manner.

It is thus possible for an energy distribution network having multiple junction boxes of this type to perform by way of example also an evaluation of the energy consumption, wherein the means for evaluating the energy consumption are arranged decentralized in the junction boxes, in other words at the site where the energy is consumed. Furthermore, the energy distribution network comprises means for transmitting data so that the results can be collected centrally.

The evaluating means that are arranged in the junction boxes can include by way of example devices for measuring the current, the voltage and/or electrical output and also include decentralized evaluation software.

Furthermore, as already described, means for switching off individual outputs are also provided.

The decentralized evaluating software can store measurement data for a predetermined time period, following which said measurement data are evaluated and the evaluation result compared for example with the up-to-date data. This is particularly advantageous in order to localize an unusually high energy consumption in a specific branch of the energy distribution network.

The decentralized evaluating software can trigger an alarm in dependence upon the result of this comparison, in other words for example transmit a piece of information, can cause an alarm lamp to light up red and/or switch off the relevant output.

The electronic switch can be by way of example a transistor switch. The isolator can be a galvanic isolator, in other words a mechanical isolator, for example a switching relay. The term 'opening/switching off the switch/isolator' is understood to mean that the electrically conductive connection between the input and the output of the switch/isolator is interrupted. The term 'closing/switching on the switch/isolator' is understood to mean that an electrically conductive connection is produced between its input and its output.

An output of this type can be switched off in the following sequence:
  Open the electronic switch by means of the evaluating program;
  Wait for a defined period of time $\Delta t$;
  Measure the potential at the output of the electronic switch by means of the evaluating program and a corresponding voltage measuring device;
  Compare the measured potential with a predefined value;
  Set a release parameter in dependence upon the measured potential being below the predetermined value;
  Open the isolator in dependence upon the release parameter.

The release parameter can preferably assume two values, for example positive or negative. The values for the release parameter are defined in dependence upon the presence of an operating voltage at the isolator. If the release parameter is positive, then the isolation procedure can be performed in a straightforward manner. If the release parameter is negative, the isolation procedure can be inhibited, for example by means of the software. Furthermore, it is possible in a similar manner to also perform a switch-on procedure, in other words close the isolator so as thus also to prevent a switch-on procedure under a load.

By virtue of such a method, a galvanic isolation that may be legally required for specific outputs/voltages etc. is fulfilled and simultaneously the isolator, for example the relay, is protected from being switched under a load so that the wear of said relay is kept to a minimum.

It is however possible to regard the procedure of switching off the galvanic isolator, which is performed in dependence upon a switch-off procedure that has been performed previously, as at least a questionable interpretation of corresponding regulations.

This method can therefore be supplemented by the provision of a priority status for the prescribed switching-off procedure, namely by performing the switching-off procedure in dependence upon the priority status. If the priority status is high, then the switching-off procedure must be performed in any case.

In the event of a switch-off procedure being performed in the case of a simultaneous negative release parameter, the count value of the internal counter is increased as a result.

As already described, an alarm can be generated as soon as a defined counter status is achieved so that the isolator is replaced after any wear that has occurred as a result. The isolator can remain in the open state until it is replaced so as to force for example a user to replace said isolator or at least to prevent said isolator being operated.

Furthermore, it is also possible by means of this switching procedure to avoid placing the isolator 'under a load.' The locking arrangement of a plug connector that is connected to the relevant output is released in dependence upon the switching-off procedure. Consequently, a plug connector can then only be inserted and/or pulled out if an associated release procedure has been performed based on the release parameter.

BRIEF DESCRIPTION OF THE SEVERAL VIEWS OF THE DRAWINGS

An exemplary embodiment of the invention is illustrated in the drawings and further explained hereinunder. In the drawings.

DETAILED DESCRIPTION

The figures contain in part simplified, schematic illustrations. In part identical reference numerals are used for identical but possibly non-identical elements. Different views of identical elements can be scaled differently.

Figure 1:
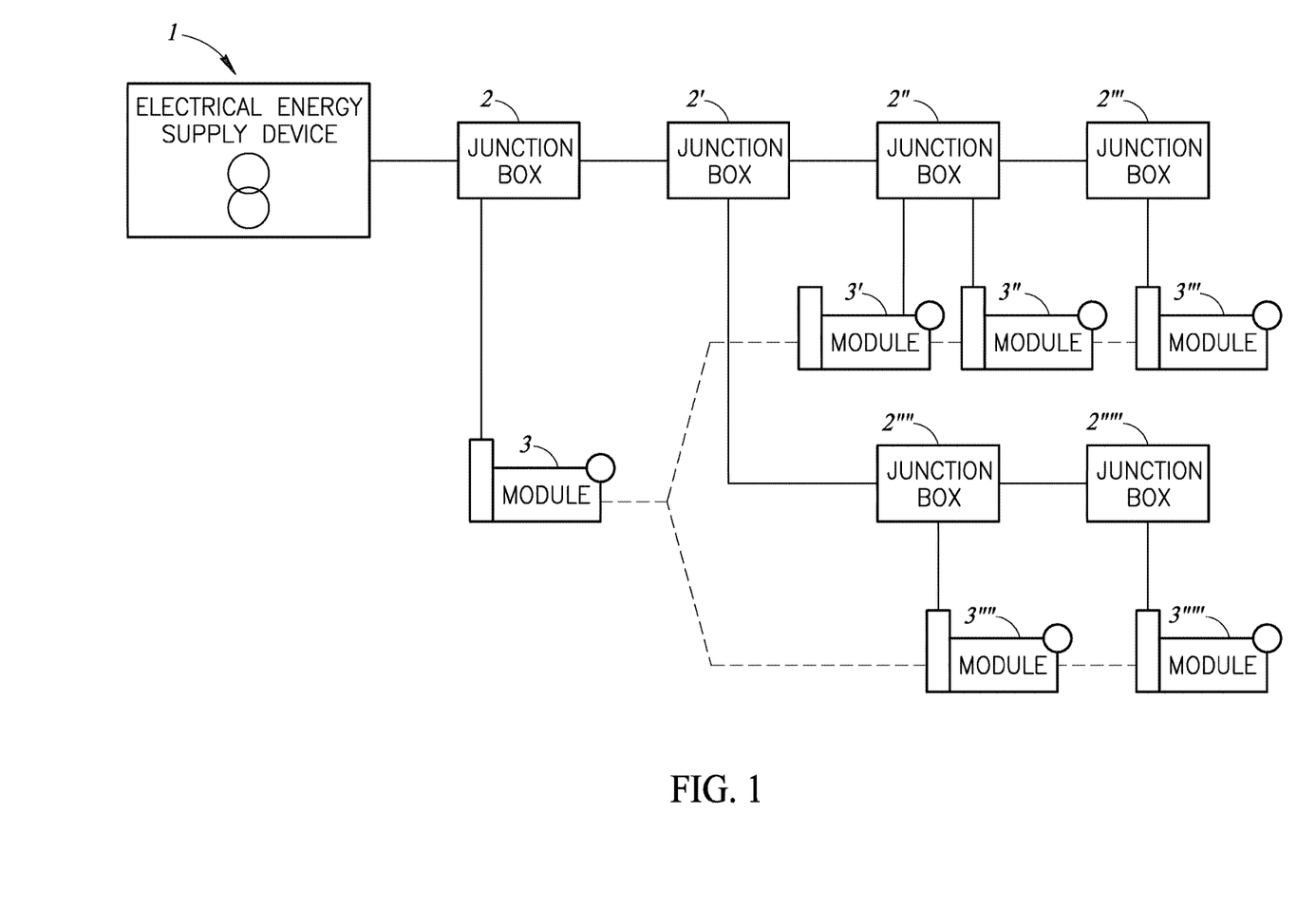
FIG. 1 illustrates a delivery system with an energy distribution network.

FIG. 1 illustrates a delivery system comprising multiple modules, 3, 3', 3", ... with an energy distribution network comprising an electrical energy supply device 1 and junction boxes 2,2',2", ....

A first junction box 2 supplies a first module 3. A second junction box 2" supplies two further junction boxes, namely a third 2" and a fifth junction box 2"". As a consequence, branches are produced in the energy distribution network.

The third junction box 2" supplies two modules, namely a second module 3' and a third module 3" and a fourth junction box 2'". The fourth junction box 2'" supplies a fourth module 3'".

The fifth junction box 2'" supplies a fifth module 3'" and a sixth junction box 2""'.

The sixth junction box 2""' supplies a sixth module 3""'.

Figure 2:
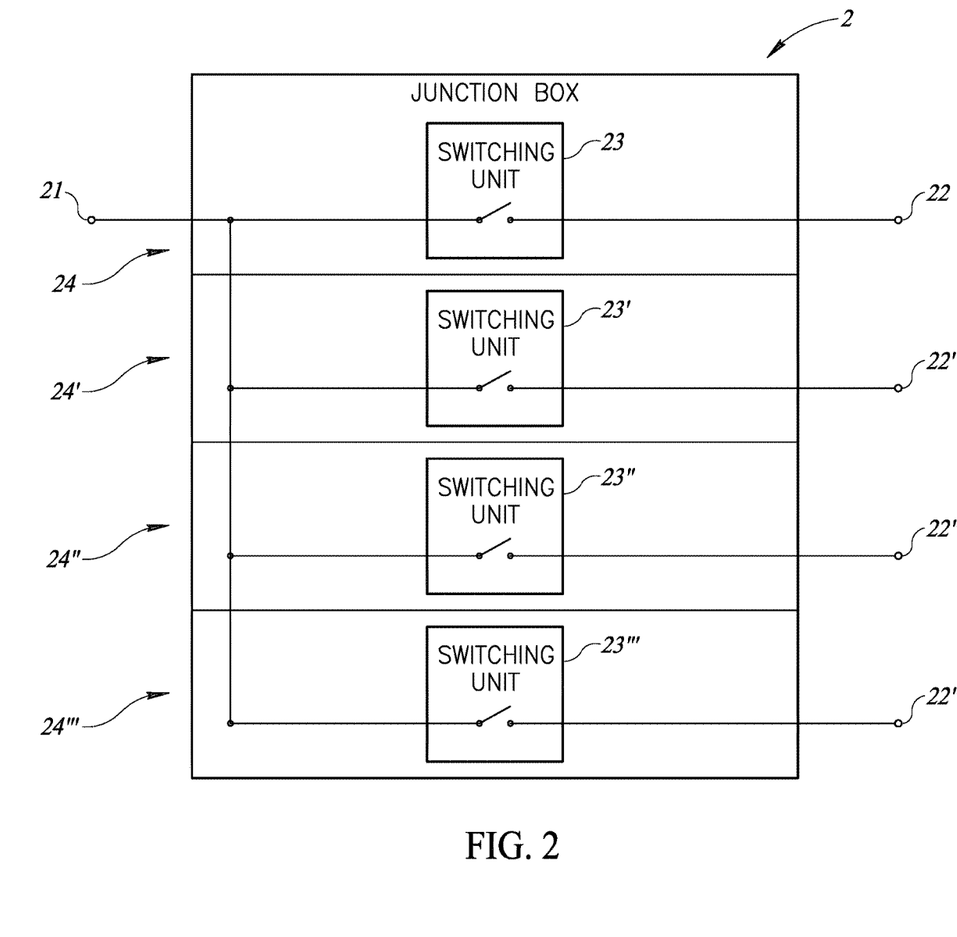
FIG. 2 illustrates a junction box having four channels.

FIG. 2 illustrates in an exemplary manner a junction box 2 having an input 21, four channels 24, 24', ... having a respective switching unit 23, 23', ... and a respective output 22, 22'.

Figure 3:
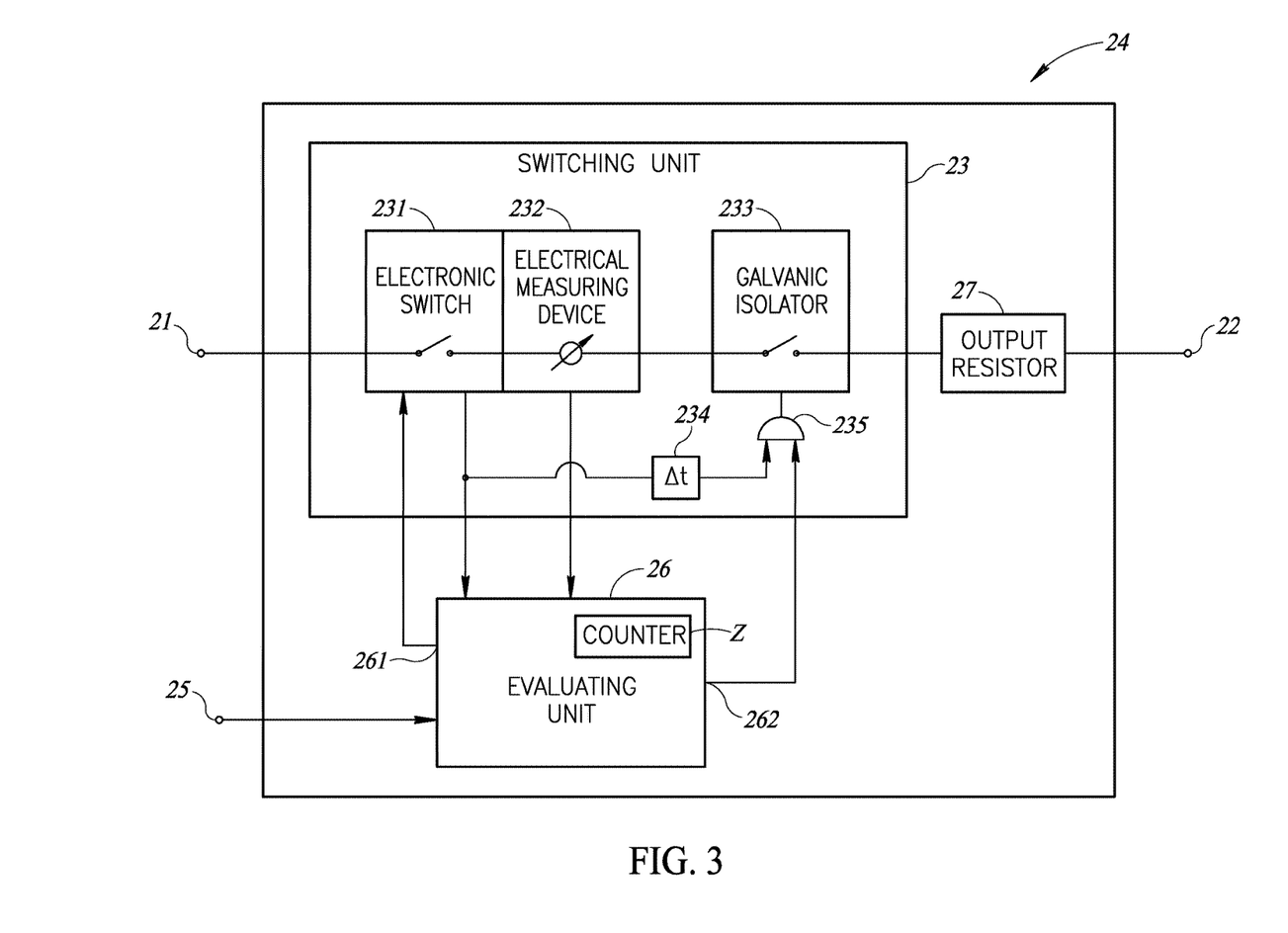
FIG. 3 illustrates a channel of the junction box.

FIG. 3 illustrates in an exemplary manner the construction of an individual channel 24.

With reference to FIG. 3, the switching unit 23 comprises an electronic switch 231 with an electrical measuring device 232 adjacent thereto, in particular a volt meter, and adjacent thereto a galvanic isolator 233, in particular a relay. This switching unit is connected on the input side to the input 21 and by way of an output resistor 27 to the output 22 of the channel. The electronic switch 231 comprises one control output that is connected by way of a data line to a delay circuit 234 ("$\Delta t$") and from there by way of an input of a logic coupling member 235 to the isolator 233. Furthermore, the electronic switch 231 is able to exchange data in a bi-directional manner with an evaluating unit 26 that includes an evaluating program and can include in addition a switch. Furthermore, the evaluating unit 26 comprises an external control input 25. The electrical measuring unit 232 comprises a data interface that is connected to the evaluating unit 26 and thus supplies the evaluating unit 26 with the relevant measurement data. The evaluating unit 26 comprises a control output 261 that can control the electronic switch 231. Furthermore, the evaluating unit 26 comprises a further control output 262 that is connected to the logic coupling member 235 and together with the delayed signal from the electronic switch 231 controls the isolator 233 by way of said logic coupling member 235.

In particular, the evaluating unit 26 comprises a counter Z that can be preferably configured as a software component.

Such a switching arrangement renders it possible to achieve the following switching-off procedure:

Open the electronic switch 231 by way of the evaluating unit 26;

Wait for a defined period of time $\Delta t$;

Measure the potential at the output of the electronic output by way of the electrical measuring device 232;

Compare the measured potential by way of the evaluating unit 26 with a predetermined value;

Set a release parameter as soon as the measured potential is below the predetermined value;

Open the mechanical isolator 233 in dependence upon the release parameter.

The release parameter can preferably assume two values, for example positive or negative independence upon the presence of an operating voltage at the isolator 233.

If the release parameter is positive, then the isolation procedure can be performed in a straightforward manner. If the release parameter is negative, then the isolation procedure can be inhibited.

In a similar manner, it is also possible for a switching-on procedure to be performed in that the isolator 233 is closed in the absence of a load before the electrical switch 231 is closed.

Furthermore, the switching-off procedure can be performed in dependence upon a priority status. If the priority status is high, then the switching-off procedure must be performed in any case. If the priority status is low, then it is still possible to perform the switch-off procedure in dependence upon the switching state of the electronic switch 231, in particular delayed by way of the delay member 234, and/or in dependence upon the measured value of the electronic measuring unit 232. The reference value $\text{Prio}_{Ref}$ can be predefined or can be set manually. It is thus possible to define different priority statuses, for example the protection of human life, the protection of devices, operational safety and reliability and the like.

In the event of a switch-off procedure being performed in the case of simultaneous negative release parameters the count value of the internal counter Z is increased as a result, which can be a component of the evaluating program.

Figure 4:
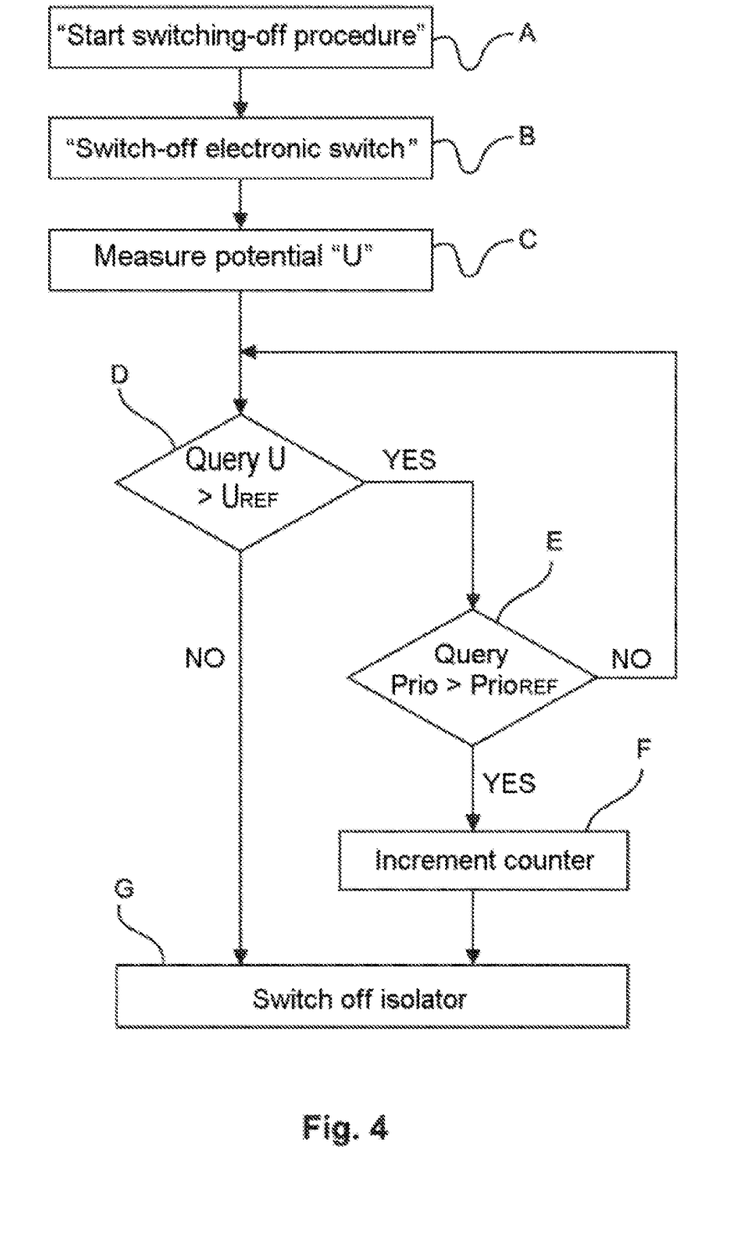
FIG. 4 illustrates a flow chart of a switching-off procedure.

This produces as a result the flow chart illustrated in FIG. 4:

A.) Start the switching-off procedure

B.) Open (switch off) the electronic switch 231 by way of the evaluating unit 26;

(not illustrated) wait for a defined period of time $\Delta t$;

C.) Measure the potential at the output of the electronic output by way of the electrical measuring device 232;

D.) Compare the measured potential U by way of the evaluating unit 26 with a predetermined value $U_{Ref}$;

If $U<U_{ref}$ then switch off/open the isolator 233;

If $U>U_{ref}$ then

E.) Query the priority of the switching-off procedure, if Prio>Prio$_{ref}$ then F.) Counter:=counter+1 (incrementation) and G.) Open (switch off) isolator 233.

As already described, it is possible to generate an alarm in the case of a specific counter state so that the isolator 233 is replaced following any wear that has been caused as a result. In particular, the isolator 233 can remain in the open state until it is replaced so as to force for example a user to replace said isolator or at least to prevent said isolator being operated.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A junction box for energy distribution, comprising an input, at least one output, an electronic switch, and a mechanical isolator that is connected in series to the electronic switch, wherein the input is connected to the at least one output by the mechanical isolator so as to transmit energy, wherein the junction box comprises an internal evaluating unit having at least one processor, a data storage device, a first control output in communication with the electronic switch for controlling an operational state of the electronic switch, and a second control output in communication with the mechanical isolator for controlling an operational state of the mechanical isolator, and wherein an evaluating program is stored in the data storage device and said evaluating program is provided for being performed by the at least one processor to control the operational state of the mechanical isolator and the transmission of energy to the at least one output.

2. The junction box in accordance with claim 1, wherein the internal evaluating unit is a separate assembly having the at least one processor as a dedicated processor and having the data storage device as a dedicated data storage device.

3. The junction box in accordance with claim 1, wherein the evaluating unit is configured to enable opening and closing of the electronic switch and the mechanical isolator.

4. The junction box in accordance with claim 3, wherein the internal evaluating unit comprises a counter for counting a number of times the mechanical isolator is opened under a load.

5. The junction box in accordance with claim 1, wherein the junction box comprises multiple separate outputs.

6. The junction box in accordance with claim 5, wherein the separate outputs can be switched off independently of one another via an associated switch.

7. The junction box in accordance with claim 6, wherein each output comprises a galvanic decoupling element.

8. An energy distribution network, comprising:

a plurality of junction boxes, each junction box including an input, at least one output, an electronic switch, and a mechanical isolator that is connected in series to the electronic switch, wherein the input is connected to the at least one output by the mechanical isolator so as to transmit energy, wherein the junction box comprises an internal evaluating unit having at least one processor, a data storage device, a first control output in communication with the electronic switch for controlling an operational state of the electronic switch, and a second control output in communication with the mechanical isolator for controlling an operational state of the mechanical isolator, and wherein an evaluating program is stored in the data storage device and said evaluating program is provided for being performed by the at least one processor to control the operational state of the mechanical isolator and the transmission of energy to the at least one output;

means for transmitting data; and means for evaluating energy consumption, wherein the evaluating means are arranged in a decentralized manner in the junction boxes.

9. The energy distribution network in accordance with claim 8, wherein the evaluating means include devices for measuring current, voltage and/or electrical output and include the evaluation program of each junction box.

10. The energy distribution network in accordance with claim 9, wherein, for each junction box, the evaluating program is configured to switch off the at least one output.

11. A method for operating an energy distribution network having a plurality of junction boxes, each junction box including an input, at least one output, an electronic switch, and a mechanical isolator that is connected in series to the electronic switch, wherein the input is connected to the at least one output by the mechanical isolator so as to transmit energy, wherein the junction box comprises an internal evaluating unit having at least one processor, a data storage device, a first control output in communication with the electronic switch for controlling an operational state of the electronic switch, and a second control output in communication with the mechanical isolator for controlling an operational state of the mechanical isolator, and wherein an evaluating program is stored in the data storage device and said evaluating program is provided for being performed by the at least one processor to control the operational state of the mechanical isolator and the transmission of energy to the at least one output, the method comprising:

storing measurement data for a predetermined period of time;

subsequently evaluating the measurement data; and comparing a result of the evaluation with up-to-date data.

12. The method in accordance with claim 11, further comprising:

triggering an alarm and/or switching off an output in dependence upon a result of the comparison.

13. A method for switching off at least one output of a junction box that includes an input, the at least one output, an electronic switch, and a mechanical isolator that is connected in series to the electronic switch, wherein the input is connected to the at least one output by the mechanical isolator so as to transmit energy, wherein the junction box comprises an internal evaluating unit having at least one processor, a data storage device, a first control output in communication with the electronic switch for controlling an operational state of the electronic switch, and a second control output in communication with the mechanical isolator for controlling an operational state of the mechanical isolator, and wherein an evaluating program is stored in the data storage device and said evaluating program is provided for being performed by the at least one processor to control the operational state of the mechanical isolator and the transmission of energy to the at least one output, the method comprising:

opening the electronic switch by way of the evaluating unit;

waiting for a defined period of time;

measuring a potential at an output of the electronic switch by way of the evaluating unit and an electronic measuring device;

comparing the measured potential with a predefined value;

setting a release parameter in dependence upon the measured potential being below the predefined value; and opening the mechanical isolator in dependence upon the release parameter.

14. The method in accordance with claim 13, further comprising:

generating a priority status for a prescribed switching-off procedure;

performing the prescribed switching-off procedure in dependence upon the priority status; and in the case of the prescribed switching-off procedure having been performed and a release parameter not being set, increasing a count value of a counter.

15. The method in accordance with claim 13, further comprising:

releasing a locking arrangement of a plug connector that is connected to the at least one output of the junction box; and removing the plug connector from the at least one output.

\* \* \* \* \*